(12) United States Patent
Chen et al.

(10) Patent No.: US 12,392,699 B1
(45) Date of Patent: Aug. 19, 2025

(54) DEFECT DETECTION METHOD AND DEVICE BASED ON NONLINEAR SYSTEM IDENTIFICATION

(71) Applicant: Wuhan Institute of Technology, Wuhan (CN)

(72) Inventors: Hanxin Chen, Wuhan (CN); Shaoyi Li, Wuhan (CN); Wenrui Yang, Wuhan (CN); Kai Tan, Wuhan (CN)

(73) Assignee: Wuhan Institute of Technology, Wuhan (CN)

( * ) Notice: Subject to any disclaimer, the term of this patent is extended or adjusted under 35 U.S.C. 154(b) by 0 days.

(21) Appl. No.: 19/203,228

(22) Filed: May 9, 2025

Related U.S. Application Data

(63) Continuation of application No. PCT/CN2025/087694, filed on Apr. 8, 2025.

(30) Foreign Application Priority Data

Apr. 16, 2024 (CN) .......................... 202410455986.5

(51) Int. Cl.
*G01N 3/34* (2006.01)

(52) U.S. Cl.
CPC ......... *G01N 3/34* (2013.01); *G01N 2203/001* (2013.01); *G01N 2203/0039* (2013.01); *G01N 2203/0062* (2013.01); *G01N 2203/0098* (2013.01); *G01N 2203/021* (2013.01); *G01N 2203/0641* (2013.01)

(58) Field of Classification Search
CPC ............... G01N 3/34; G01N 2203/001; G01N 2203/0039; G01N 2203/0641; G01N 2203/0098; G01N 2203/021; G01N 2203/0062
See application file for complete search history.

(56) References Cited

U.S. PATENT DOCUMENTS 11,662,285 B2 * 5/2023 Suetti ................. G01N 29/2437
73/12.09

FOREIGN PATENT DOCUMENTS

CN 102118678 A 7/2011

OTHER PUBLICATIONS

Pan Mingzhi et al., "Study on the method of frequency response characteristics for assembly quality detection defect identification of complex structures", Journal of Gun Launch & Control, Sep. 30, 2021, pp. 87-92, 99, vol. 2, No. 3.

* cited by examiner

*Primary Examiner* — Jonathan M Dunlap

(57) ABSTRACT

A defect detection method and device based on nonlinear system identification are provided. The defect detection method includes: performing, by a modal force hammer, hammer excitation on a test specimen according to a test schedule to generate an excitation signal and a response signal; acquiring, by a laser vibrometer, the excitation signal and the response signal; performing parameter calculation on the excitation signal and the response signal to obtain model parameters; constructing an initial Hammerstein model based on the model parameters; optimizing the initial Hammerstein model to obtain a Hammerstein model of the test specimen; adjusting the Hammerstein model of the test specimen by using a cross-validation method; perform defect determination based on the Hammerstein model of the test specimen adjusted and a pre-constructed template specimen model to obtain a determination result, and determining whether the test specimen is defective based on the determination result.

9 Claims, 2 Drawing Sheets setting a test schedule according to a size of a test specimen; performing, by a modal force hammer, hammer excitation on the test specimen according to the test schedule to generate an excitation signal; and making the test specimen vibrate based on the excitation signal to generate a response signal

↓ acquiring, by a laser vibrometer, the excitation signal and the response signal

↓ performing nonlinear parameter calculation on the excitation signal and the response signal to obtain an initial nonlinear parameter; performing linear parameter calculation on the excitation signal and the response signal to obtain an initial linear parameter; constructing an initial Hammerstein model based on the initial nonlinear parameter and the initial linear parameter; and optimizing the initial Hammerstein model to obtain a Hammerstein model of the test specimen

↓ adjusting the Hammerstein model of the test specimen by using a cross-validation method to obtain an adjusted Hammerstein model of the test specimen; performing defect determination based on the adjusted Hammerstein model of the test specimen and a pre-constructed template specimen model to obtain a determination result; and determining whether the test specimen is defective based on the determination result

FIG. 1

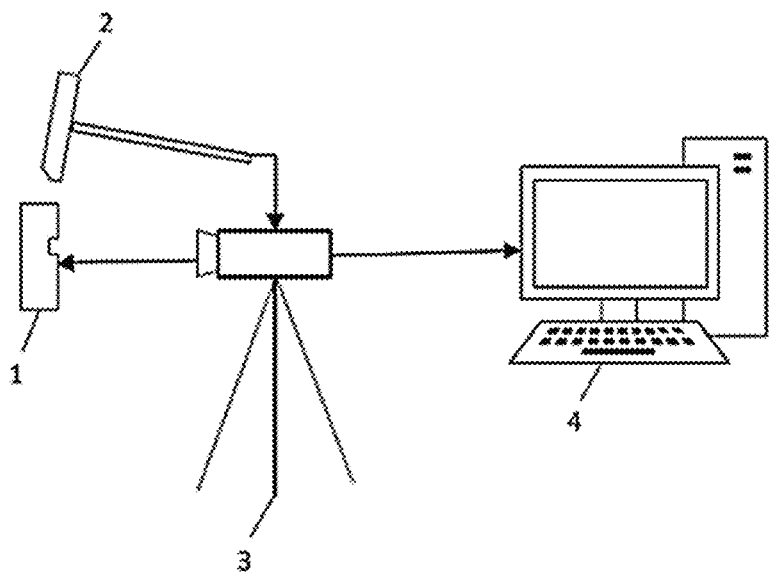

FIG. 2

DEFECT DETECTION METHOD AND DEVICE BASED ON NONLINEAR SYSTEM IDENTIFICATION

CROSS-REFERENCE TO RELATED APPLICATION

This application claims priority to Chinese Patent Application No. 202410455986.5, filed on Apr. 16, 2024, which is herein incorporated by reference in its entirety.

TECHNICAL FIELD

The disclosure relates to the technical field of system identification, and more particularly to a defect detection method and device based on nonlinear system identification.

BACKGROUND

In a process of production and use of metal materials, it is a common problem that the metal materials have defects. Metal components are made of the metal materials, and structures of the metal components will be damaged if the metal materials have defects so as to affect a normal operation and safety of an equipment. Therefore, a defect detection of the metal materials is a very important detecting task in a metal industry. It is necessary to ensure that during a detection process, objects to be detected are not damaged so as to avoid increasing defects, therefore, non-destructive detecting is carried out on the objects to be detected.

In the technical field of system identification, the system identification is carried out by using linear models and nonlinear models. A parameter identification technology for linear models is already relatively mature. However, if a state and output variables of a system cannot be described by a linear relationship under influences of external conditions, the system belongs to a nonlinear system. Due to nonlinear effects generated by defects existing in the metal materials, research on combining system identification technology with non-destructive detecting technology and putting it into practical production and detecting is still in its infancy. Therefore, how to combine system identification technology with non-destructive detecting technology has become an urgent problem to be solved.

SUMMARY

Technical problem to be solved by the disclosure is to provide a defect detection method and device based on nonlinear system identification for detecting defects in metal materials by combining non-destructive detecting technology with nonlinear system identification technology, in response to deficiencies in related art.

To solve aforementioned technical problem, a technical solution adopted by the disclosure is as follows: a defect detection method based on nonlinear system identification, including the following steps:
  setting a test schedule according to size of a test specimen; performing, by a modal force hammer, hammer excitation on the test specimen according to the test schedule to generate an excitation signal; and making the test specimen vibrate based on the excitation signal to generate a response signal;
  acquiring, by a laser vibrometer, the excitation signal and the response signal;
  performing nonlinear parameter calculation on the excitation signal and the response signal to obtain an initial nonlinear parameter; performing linear parameter calculation on the excitation signal and the response signal to obtain an initial linear parameter; constructing an initial Hammerstein model based on the initial nonlinear parameter and the initial linear parameter; and optimizing the initial Hammerstein model to obtain a Hammerstein model of the test specimen; and
  adjusting the Hammerstein model of the test specimen by using a cross-validation method to obtain an adjusted Hammerstein model of the test specimen; performing defect determination based on the adjusted Hammerstein model of the test specimen and a pre-constructed template specimen model to obtain a determination result, and determining whether the test specimen is defective based on the determination result.

In an embodiment, the defect detection method further includes: in response to determining that the test specimen is defective, repairing the defective test specimen.

To solve aforementioned technical problem, another technical solution adopted by the disclosure is as follows.

A defect detection device based on nonlinear system identification includes a signal generation unit, a signal acquisition unit, a model construction unit, and a defect detection unit.

The signal generation unit is configured to set the test schedule according to the size of the test specimen; perform, by a modal force hammer, hammer excitation on the test specimen according to the test schedule to generate the excitation signal; and make the test specimen vibrate based on the excitation signal to generate the response signal.

The signal acquisition unit is configured to acquire, by a laser vibrometer, the excitation signal and the response signal.

The model construction unit is configured to perform nonlinear parameter calculation on the excitation signal and the response signal to obtain the initial nonlinear parameter; perform linear parameter calculation on the excitation signal and the response signal to obtain the initial linear parameter; construct the initial Hammerstein model based on the initial nonlinear parameter and the initial linear parameter; and optimize the initial Hammerstein model to obtain the Hammerstein model of the test specimen.

The defect detection unit is configured to adjust the Hammerstein model of the test specimen by using a cross-validation method to obtain the adjusted Hammerstein model of the test specimen; perform defect determination based on the adjusted Hammerstein model of the test specimen and a pre-constructed template specimen model to obtain the determination result, and determine whether the test specimen is defective based on the determination result.

The disclosure has a beneficial effect that a structural damage detection technology of the test specimen is optimized, so that defects can be detected by establishing a nonlinear system model.

System identification technology is configured to perform non-destructive detecting of the test specimen. Since microdefects on the test specimen can produce nonlinear effects, a Hammerstein model is selected as a nonlinear model, and the Hammerstein model has advantages of fewer parameters to be identified and strong flexibility. By performing feature comparison on the adjusted Hammerstein model of the test specimen against and the pre-constructed template specimen model and summarizing model features, qualitative analysis is carried out to achieve the objectives of detecting defects.

BRIEF DESCRIPTION OF DRAWINGS

FIG. 1 illustrates a flowchart of a defect detection method based on nonlinear system identification according to embodiments in the disclosure.

FIG. 2 illustrates a schematic structural diagram of a defect detection device based on nonlinear system identification according to embodiments in the disclosure.

Figure 3:
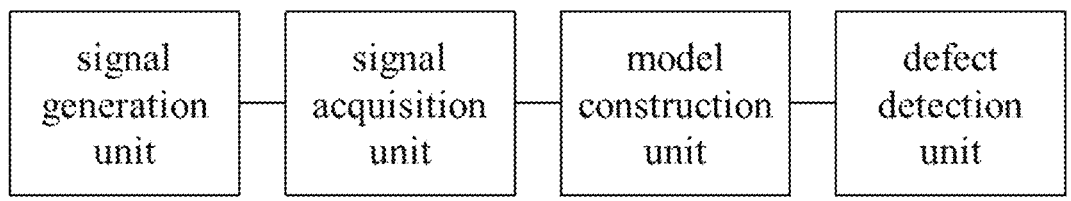
FIG. 3 illustrates a unit block diagram of the defect detection device based on nonlinear system identification according to embodiments in the disclosure.

Description of reference numerals: 1: test specimen; 2: modal force hammer; 3: laser vibrometer; 4: signal processing platform.

DETAILED DESCRIPTION OF EMBODIMENTS

Principles and features of the disclosure are described below with reference to attached drawings, and embodiments in the specification are only to specify the disclosure, not to limit a scope of protection of the disclosure.

Defect detection technology for metal materials is applied in fields of aerospace, petrochemical industry, and automobile manufacturing, therefore, it is very necessary to perform defect detection on the metal materials. It is necessary to ensure that during a detection process, objects to be detected are not damaged so as to avoid increasing defects, therefore, non-destructive detecting is carried out on the objects to be detected. But research on combining system identification technology with non-destructive detecting technology and putting it into practical production and detecting is still in its infancy. Therefore, how to combine system identification technology with non-destructive detecting technology has become an urgent problem to be solved.

As illustrated in FIG. 1, a defect detection method based on nonlinear system identification is provided in the disclosure, and includes the following steps.

A test schedule is set according to a size of a test specimen; a hammer excitation is performed on the test specimen by a modal force hammer according to the test schedule to generate an excitation signal; and the test specimen is made to vibrate based on the excitation signal to generate a response signal.

The excitation signal and the response signal are acquired by a laser vibrometer.

The excitation signal and the response signal are performed with nonlinear parameter calculation to obtain an initial nonlinear parameter; the excitation signal and the response signal are performed with linear parameter calculation to obtain an initial linear parameter; an initial Hammerstein model is constructed based on the initial nonlinear parameter and the initial linear parameter, and the initial Hammerstein model is optimized to obtain a Hammerstein model of the test specimen.

The Hammerstein model of the test specimen is adjusted by using a cross-validation method to obtain an adjusted Hammerstein model of the test specimen; a defect determination is performed based on the adjusted Hammerstein model of the test specimen and a pre-constructed template specimen model to obtain a determination result, and whether the test specimen is defective is determined based on the determination result.

In an embodiment, as illustrated in FIG. 2, a common thin aluminum alloy sheet with a length of 250 mm, a width of 50 mm and a thickness of 2 mm is selected as a test specimen 1. A micro-crack is disposed on the test specimen 1, and the test specimen 1 is fixed by a fixture. A modal force hammer 2 is configured to apply an excitation force to the test specimen 1 according to the test schedule to make the test specimen 1 vibrate. A force signal generated by the excitation force is the excitation signal of a nonlinear system where test specimen 1 is located. The response signal is obtained from a vibration displacement function (i.e., a response function) of test specimen 1 under the excitation signal. Once all test groups in the test schedule have been completed, the response signal and the excitation signal can be exported. Vibrations of test specimen 1 at each time period can be processed in real time by a vibration signal measurement and testing platform (i.e., a signal processing platform 4).

Each time period can be understood as: because hammering positions set in the test schedule are different, hammering time periods are different, so the test specimen 1 will vibrate in multiple time periods (i.e., test times corresponding to multiple test groups).

A laser vibrometer 3 includes a laser controller and a control module. The control module includes an acquisition card. Relevant parameters of the laser vibrometer 3 are set through the control module of the laser vibrometer 3, and the relevant parameters include an acquisition channel, a sampling frequency, a trigger setting, and a preprocessing function, e.g.

The laser vibrometer 3 is configured to acquire the excitation signal and the response signal, and a brand of the laser vibrometer 3 is Julight®.

Before the test schedule is set according to the size of the test specimen, the defect detection method further includes the following steps.

Setting parameters such as a size, a material, and a defect range of a metal plate of the test specimen 1 are determined; and a vibro remote console laser controller of the laser vibrometer 3 is configured to set a laser focal length according to the setting parameters and turn on a laser.

In an embodiment, basic parameters (i.e., the relevant parameters) of signal channels of the control module of the laser vibrometer 3 are set based on a basic data of a force hammer (i.e., the modal force hammer). Channel one is set as an input channel with a sensitivity of 2.42 millivolts per newton (mV/N), and channel two is set as an output channel. According to the size, the material, and the defect range of the metal plate of the test specimen 1, a sampling frame rate is set to 5.12 kilohertz (K Hz), a selected spectral line is set to 1600, and a frequency bandwidth is set to 2 KHz. An excitation is performed by a linear averaging mode, and a trigger delay is set to −20 milliseconds (ms), a trigger threshold is set to 0.4%, and a trigger hysteresis is set to 0.2%. A window function added to an input signal (i.e., the excitation signal) is a rectangular window function. A window function added to an output signal (i.e., the response signal) is an exponential window, with a main window offset of 5 ms and a decay constant of 100 ms. A high-pass filter is applied to the response signal during a preprocessing stage with a first 3 decibel (dB) frequency of 5 Hz and a second 3 dB frequency of 1.2 K H z.

The defect detection method further includes the following steps. A direction of the laser emitted by the laser controller of the laser vibrometer 3 is set to be a positive direction of a Z axis of a world coordinate system; since the excitation signal is the excitation force applied to test specimen 1 to make the test specimen 1 to vibrate, a direction of the excitation signal is set to be a negative direction of the Z axis of the world coordinate system (i.e., a direction opposite to an emission direction of the laser) in the test schedule; since the response signal represents the vibration displacement function of test specimen 1 after being excited, a direction of the response signal is set to be the positive direction of the Z axis of the world coordinate system (i.e., a direction same as the emission direction of the laser) in the test schedule. The laser controller is configured to turn on the laser (i.e., a laser with the positive direction of the Z axis of the world coordinate system). A modal force hammer 2 is configured to perform hammer excitation on the test specimen 1 according to the test schedule to generate the excitation signal, and send the excitation signal to the control module. After the excitation signal is applied to the test specimen 1, the test specimen 1 is configured to generate a vibration based on the excitation signal, and the vibration will cause a slight change in the laser. The laser controller is configured to receive the slight change (i.e., the response signal) caused by the vibration and send the response signal to the control module. The control module of the laser vibrometer 3 is configured to acquire the excitation signal and the response signal and send the excitation signal and the response signal to the signal processing platform 4. The signal processing platform 4 is configured to process the excitation signal and the response signal; construct the initial Hammerstein model and the Hammerstein model of the test specimen 1; and determine whether the test specimen 1 is defective.

It should be noted that, system identification is to determine a model equivalent to an observed system from a set of models (such as linear models or nonlinear models) based on an input data and an output data of the observed system (i.e., system identification is a technology of modeling by using the input data and the output data of the observed system), and the observed system is a testing system that generates corresponding signals (i.e., the excitation signal and the response signal) when the modal force hammer performs hammer excitation on the test specimen according to the test schedule.

Non-destructive detecting is carried out through the modal force hammer. Since non-destructive detecting measures the objects to be detected without causing any harm or damage to the objects to be detected, a biggest advantage of non-destructive detecting is that it can obtain accurate data without damaging the objects to be detected, so as to evaluate a performance, a damage degree and other information of the objects to be detected.

In the embodiment, during using nonlinear system identification technology, a model corresponding to the nonlinear system is optimized and improved, that is, an optimization algorithm of model parameters is improved to improve a superiority and performance of the model. Referring to hammering method in modal analysis, the modal force hammer is configured to perform hammer excitation on a metal material to achieve objectives of non-destructive testing; and the laser vibrometer is configured to complete an acquisition and processing of the excitation signal and the response signal, so as to obtain an input data and an output data (i.e., the excitation signal and the response signal) of the nonlinear system where the test specimen is located. Since defects of the test specimen will cause nonlinear effect, the excitation signal and response signal acquired after hammering the test specimen is processed to establish a nonlinear model of the test specimen, so as to determine whether the test specimen is defective based on the nonlinear model.

In an embodiment, a step for setting the test schedule according to a size of a test specimen includes:
  determining a number of detection contacts according to the size of the test specimen; setting an arrangement mode of the detection contacts; and setting the test schedule according to the arrangement mode.

In an embodiment, according to the size of the test specimen, the number and the arrangement mode of the detection contacts detected by the laser vibrometer on the test specimen to be detected are determined, and then the test schedule is set, and the hammer excitation is applied to the detection contacts in turn according to a test sequence in the test schedule, and the response signal and excitation signal of each time period are acquired by the control module of the laser vibrometer.

The test schedule can be configured to apply excitation signals to a same test specimen multiple times (i.e., at different frequencies) to obtain multiple corresponding response signals. This can greatly improve an accuracy of the model and fully avoid a contingency of an experiment.

In the embodiment, setting detection contacts of hammering according to a size of a metal test specimen in a distributed way can comprehensively detect defects in the metal test specimen and avoid risks of incomplete detection of the defects of the metal test specimen and an existence of micro-cracks caused by only performing local detection.

In an embodiment, after the excitation signal and the response signal are acquired by a laser vibrometer, the defect detection method further includes:
  adding a rectangular window function to the excitation signal to obtain an excitation signal after adding the rectangular window function, and adding an exponential window function to the response signal to obtain a response signal after adding the exponential window function; and
  performing noise reduction processing on the excitation signal after adding the rectangular window function and the response signal after adding the exponential window function.

It should be noted that, a window function is a mathematical function used for signal processing and spectrum analysis. Corresponding window functions are added to the excitation signal and the response signal respectively. A window is applied to an original signal to gradually attenuate two ends of the original signal, thereby reducing a degree of influence of spectrum leakage (i.e., reducing spectrum leakage and improving spectrum resolution) to better analyze and process the original signal. Specifically, the rectangular window function has an advantage of the highest frequency in frequency identification, and the exponential window function can smooth abrupt sample points after weighting a signal, making a signal more continuous.

In the embodiment, adding a window function to the signal is helpful to reduce spectrum leakage and suppress signal noise, improve frequency resolution, and reduce or eliminate noise by performing noise reduction processing on the signal, so as to restore a clarity of the original signal and reduce errors generated in signal processing.

In an embodiment, a step for performing the nonlinear parameter calculation on the excitation signal and the response signal to obtain the initial nonlinear parameter includes:
  performing the nonlinear parameter calculation on the excitation signal and the response signal based on a polynomial nonlinear function to obtain the initial nonlinear parameter, in which the polynomial nonlinear function is expressed as follows:

$$p(x)=a_0+a_1x+a_2x^2+\cdots+a_{n-1}x^{n-1}+a_nx^n$$

in which, p(x) represents the initial nonlinear parameter (i.e., parameter data corresponding to the response signal generated by the vibration of the test specimen under the excitation signal), x represents a static excitation parameter (i.e., parameter data corresponding to the excitation signal), n represents a highest degree of the polynomial nonlinear function, $a_0, a_1, a_2, \ldots, a_{n_1}$, and $a_n$ represent coefficients of the polynomial nonlinear function, $a_0$, $a_1$, $a_2$, ..., $a_{n-1}$, and $a_n>1$, and $a_0$, $a_1$, $a_2$, ..., $a_{n-1}$, and $a_n \neq 1$.

In an embodiment, the polynomial nonlinear function is configured to describe a nonlinear relationship between input variables (i.e., the excitation signal) and output variables (i.e., the response signal), and the polynomial nonlinear function approximates complex nonlinear phenomena through a series of power terms of the input variables and is expressed in a form of a weighted sum of the input variables.

In the embodiment, a computational complexity of the polynomial nonlinear function is relatively low, even high-order polynomials can be calculated quickly, making the polynomial nonlinear function able to calculate quickly to obtain parameters in nonlinear systems. Moreover, the polynomial nonlinear function can be combined with other types of models (such as linear dynamic models) to form a complex mixed model (i.e., Hammerstein model) to describe the defects of the test specimen.

In an embodiment, a step for performing the linear parameter calculation on the excitation signal and the response signal to obtain the initial linear parameter includes the following steps S1-S3.

In step S1, the excitation signal is performed with the linear parameter calculation based on a polynomial input function to obtain an input linear parameter, in which the polynomial input function is expressed as follows:

$$A(q^{-1}) = a_0 + a_1 q^{-1} + a_2 q^{-2} + \cdots + a_{n_a} q^{-n_a}$$

in which, $A(q^{-1})$ represents the input linear parameter; $q^{-1}$ represents a unit backward shift operator that delays a time index of a signal sequence by one unit, correspondingly, $q^{-2}$ delays the time index of the signal sequence by two units, $q^{-n_a}$ delays the time index of the signal sequence by $n_a$ units; $a_1$, $a_2$, ..., and $a_{n_a}$ represent coefficients of the polynomial input function, and $n_a$ represents an order of the polynomial input function.

In step S2, the response signal is performed with the linear parameter calculation based on a polynomial output function to obtain an output linear parameter, in which the polynomial output function is expressed as follows:

$$B(q^{-1}) = b_0 + b_1 q^{-1} + b_2 q^{-2} + \cdots + b_{n_b} q^{-n_b}$$

in which, $B(q^{-1})$ represents the output linear parameter, $q^{-1}$ represents a unit backward shift operator, $b_0$, $b_1$, $b_2$, ..., and $b_{n_b}$ represent coefficients of the polynomial output function, and $n_b$ represents an order of the polynomial output function.

In step S3, the initial linear parameter is calculated based on the input linear parameter, the output linear parameter and a discrete transfer function, in which the discrete transfer function is expressed as follows:

$$G(q^{-1}) = \frac{B(q^{-1})}{A(q^{-1})}$$

in which, $G(q^{-1})$ represents the initial linear parameters.

It should be noted that, the unit backward shift operator represents a time delay in the signal, and its function is to delay a time index of a signal sequence or function by one unit. In a discrete time signal processing, the unit backward shift operator can capture a change of signal with time. The polynomial input function is a changed function of the input signal (i.e., the excitation signal) after being calculated by the unit backward shift operator. The polynomial output function is a changed function of the output signal (i.e., the response signal) after being calculated by the unit backward shift operator. The discrete transfer function is used to describe a linear relationship between the input signal and the output signal in discrete time, is usually expressed by difference equation, and describes how a nonlinear system responds to an input signal.

In the embodiment, the linear relationship between the input signal and the output signal in discrete time is calculated by a difference equation. The discrete transfer function is configured to linearly analyze a nonlinear system, more accurately analyze a dynamic response change of the nonlinear system in which the test specimen is located, and further describe the defects of the test specimen.

In an embodiment, a step for optimizing the initial Hammerstein model to obtain the Hammerstein model of the test specimen includes:
performing optimizing calculation on the initial nonlinear parameter based on an adaptive particle swarm optimization (APSO) algorithm to obtain a nonlinear parameter;
performing fitting calculation on the initial linear parameter by using a least square method to obtain a linear parameter; and
constructing the Hammerstein model of the test specimen according to the nonlinear parameter and the linear parameter.

It should be noted that, an essence of parameter identification based on APSO algorithm of a Hammerstein nonlinear model is: transforming a problem of parameter identification into a problem of parameter space optimization, searching a whole static nonlinear parameter domain in the model, and finally obtaining an optimal static parameter.

In the embodiment, performing optimizing calculation on parameter in a static nonlinear part of the model through the APSO algorithm can utilize individual local information and group global information for parameter search to improve a convergence speed of the APSO algorithm. The APSO algorithm has low requirements for computer memory and CPU, so that an identification speed is faster, and further the optimal static parameter can be extracted. That is, the APSO algorithm minimizes a difference between an identification model (i.e., the initial Hammerstein model) and an actual model (i.e., the Hammerstein model of the test specimen), making the model more accurate. By performing fitting calculation on parameter in a dynamic linear part by using the least square method, a fitting process is simple and does not need complex calculation. The least square method can complete a data fitting process in a shorter time, is convenient and fast, and can automatically correct errors according to an actual situation, so as to obtain more accurate fitting results. By adjusting parameters calculated by the discrete transfer function, dynamic responses and steady-state errors of the system can be optimized, so that an identification speed is faster, further the difference between the identification model and the actual model is minimum, and the model is more accurate.

In an embodiment, after the excitation signal and the response signal are acquired by the laser vibrometer, the defect detection method further includes:
performing, by the modal force hammer, hammer excitation on the test specimen according to the test schedule to generate the excitation signal, and making the test specimen vibrate based on the excitation signal to generate the response signal;
acquiring, by the laser vibrometer, the excitation signal and the response signal; and taking the excitation signal and the response signal as a set of data; repeating generating and acquiring the excitation signal and the response signal multiple times to acquire multiple sets of data, and constructing a data set based on the multiple sets of data to obtain a pre-constructed dataset.

In the embodiment, the data set is constructed to facilitate adjusting the Hammerstein model of the test specimen by using a K-fold cross-validation method.

In an embodiment, a step for adjusting the Hammerstein model of the test specimen by using the cross-validation method to obtain the adjusted Hammerstein model of the test specimen includes:

dividing the pre-constructed data set into multiple training sets in a same proportion by using the K-fold cross-validation method; selecting one of the multiple training sets as a validation set; training the Hammerstein model of the test specimen by using remaining training sets of the multiple training sets to obtain a trained Hammerstein model of the test specimen; validating the trained Hammerstein model of the test specimen by using the validation set to obtain a performance evaluation index; and taking each of the multiple training sets as a validation set to repeat the training and the validating to thereby obtain performance evaluation indexes of validation sets respectively corresponding to the plurality of training sets; and averaging the performance evaluation indexes of all the validation sets to obtain an average value of the performance evaluation indexes, and adjusting the Hammerstein model of the test specimen according to the average value of the performance evaluation indexes to obtain the adjusted Hammerstein model of the test specimen.

In an embodiment, by using the K-fold cross-validation method, the data set pre-constructed is divided into subsets K in quantity in the same proportion, and the subsets are called folds. Then, K rounds of training and validating are carried out. In each round, one of the folds is selected as the validation set, and remaining folds K-lin quantity are used as training sets. This process is repeated K rounds to ensure that each fold is used as the validation set once. Finally, an average value of the performance indexes validated for k times is taken as a performance evaluation result of the Hammerstein model of the test specimen. According to the performance evaluation result, parameter of the Hammerstein model of the test specimen is adjusted to improve a fitting performance of the Hammerstein model of the test specimen.

It should be noted that, the cross-validation method is a validation technology to evaluate a performance of a data mining model.

In the embodiment, a validity of a final model is validated by the cross-validation method. By simulating a model performance on unknown data, a generalization ability of the model can be evaluated. The cross-validation method can make more full use of the data set, reduce fluctuations in model performance caused by different data division, and can select optimal parameters by comparing the model performance under different parameter settings, and can further detect whether the model suffers from overfitting or underfitting problems, so as to evaluate the model performance and select characteristics of the optimal parameters of the model.

In an embodiment, steps for performing the defect determination based on the adjusted Hammerstein model of the test specimen and the pre-constructed template specimen model to obtain the determination result, and determining whether the test specimen is defective based on the determination result, include:

performing feature comparison on the adjusted Hammerstein model of the test specimen and the pre-constructed template specimen model to obtain comparison features, and determining whether the test specimen is defective based on the comparison features and preset defect conditions.

In the embodiment, objectives of defect identification are achieved by comparing a defect-free test specimen model (i.e., the pre-constructed template specimen model) with a defective test specimen model (i.e., the adjusted Hammerstein model of the test specimen) to summarize features and observing differences between expression of the defective test specimen model and expression of the defect-free test specimen model.

In an embodiment, each model described above, such as the initial Hammerstein model, the Hammerstein model, the adjusted Hammerstein model, the pre-constructed template model, the linear model, and the nonlinear model, is embodied by at least one processor and at least one memory coupled to the at least one processor, and the at least one memory stores computer programs executable by the at least one processor.

As illustrated in FIG. 3, the disclosure provides a defect detection device based on nonlinear system identification, and the defect detection device includes a signal generation unit, a signal acquisition unit, a model construction unit, and a defect detection unit.

The signal generation unit is configured to set the test schedule according to the size of the test specimen; perform, by the modal force hammer, hammer excitation on the test specimen according to the test schedule to generate the excitation signal; and make the test specimen vibrate based on the excitation signal to generate the response signal.

The signal acquisition unit is configured to acquire, by the laser vibrometer, the excitation signal and the response signal.

The model construction unit is configured to perform nonlinear parameter calculation on the excitation signal and the response signal to obtain the initial nonlinear parameter; perform linear parameter calculation on the excitation signal and the response signal to obtain the initial linear parameter; construct the initial Hammerstein model based on the initial nonlinear parameters and the initial linear parameters, and optimize the initial Hammerstein model to obtain the Hammerstein model of the test specimen.

The defect detection unit is configured to adjust the Hammerstein model of the test specimen by using the cross-validation method to obtain the adjusted Hammerstein model of the test specimen; perform defect determination based on the adjusted Hammerstein model of the test specimen and the pre-constructed template specimen model to obtain the determination result, and determine whether the test specimen is defective based on the determination result.

In an embodiment, each of the signal generation unit, the signal acquisition unit, the model construction unit, and the defect detection unit is embodied by at least one processor and at least one memory coupled to the at least one processor, and the at least one memory stores computer programs executable by the at least one processor.

Embodiments and benefit effects of the defect detection device based on nonlinear system identification can refer to that of the defect detection method based on nonlinear system identification specifically described above, and will not be repeated here.

It should be noted that, in the description, relationship terms such as "first" and "second" are only used to distinguish one entity or operation from another entity or operation and do not necessarily require or imply any such actual relationship or order between these entities or operations. And terms "including", "comprising" or any other variation thereof are intended to cover non-exclusive inclusion, so that a process, method, article or equipment including a series of elements includes not only those elements, but also other elements not explicitly listed or elements inherent to such process, method, article or equipment.

Those skilled in the art should be clearly noted that, for convenience and brevity of the description, specific working processes of above-mentioned device and units can refer to corresponding processes in aforementioned methods and embodiments, and will not be repeated here.

In the embodiments provided by the disclosure, it should be noted that, disclosed device and method can be realized in other ways. For example, the device embodiment described above is only schematic. For example, a division of units is only a logical function division, in actual implementation, the units may be divided in other ways. For example, multiple units or components can be combined or integrated into another system, or some features can be ignored or not implemented.

The units described as separate components may or may not be physically separated, and the components displayed as units may or may not be physical units, that is, they may be located in one place or distributed to multiple network units. Some or all of the units can be selected according to actual needs to achieve the objectives of solutions adopted by the embodiments of the disclosure.

The aforementioned embodiments are just part of the embodiments, and are not to limit the disclosure. Any modification, equivalent substitution, improvement, etc. made to the embodiments within a spirit and principle of the disclosure fall within a scope of protection of the disclosure.

What is claimed is:

1. A defect detection method based on nonlinear system identification, comprising the following steps:
    setting a test schedule according to a size of a test specimen; performing, by a modal force hammer, hammer excitation on the test specimen according to the test schedule to generate an excitation signal; and making the test specimen vibrate based on the excitation signal to generate a response signal;
    acquiring, by a laser vibrometer, the excitation signal and the response signal;
    performing nonlinear parameter calculation on the excitation signal and the response signal to obtain an initial nonlinear parameter; performing linear parameter calculation on the excitation signal and the response signal to obtain an initial linear parameter; constructing an initial Hammerstein model based on the initial nonlinear parameter and the initial linear parameter; and optimizing the initial Hammerstein model to obtain a Hammerstein model of the test specimen; and
    adjusting the Hammerstein model of the test specimen by using a cross-validation method to obtain an adjusted Hammerstein model of the test specimen; performing defect determination based on the adjusted Hammerstein model of the test specimen and a pre-constructed template specimen model to obtain a determination result; and determining whether the test specimen is defective based on the determination result;
    wherein the performing defect determination based on the adjusted Hammerstein model of the test specimen and the pre-constructed template specimen model to obtain the determination result, and determining whether the test specimen is defective based on the determination result comprises:
    performing feature comparison on the adjusted Hammerstein model of the test specimen and the pre-constructed template specimen model to obtain comparison features; and
    determining whether the test specimen is defective based on the comparison features and preset defect conditions.

2. The defect detection method based on nonlinear system identification as claimed in claim 1, wherein the setting the test schedule according to the size of the test specimen comprises:
    determining a number of detection contacts according to the size of the test specimen; setting an arrangement mode of the detection contacts; and setting the test schedule according to the arrangement mode.

3. The defect detection method based on nonlinear system identification as claimed in claim 1, wherein after the acquiring, by the lase vibrometer, the excitation signal and the response signal, the defect detection method further comprises:
    adding a rectangular window function to the excitation signal to obtain an excitation signal after adding the rectangular window function; and adding an exponential window function to the response signal to obtain a response signal after adding the exponential window function; and
    performing noise reduction processing on the excitation signal after adding the rectangular window function and the response signal after adding the exponential window function.

4. The defect detection method based on nonlinear system identification as claimed in claim 1, wherein the performing the nonlinear parameter calculation on the excitation signal and the response signal to obtain the initial nonlinear parameter comprises:
    performing the nonlinear parameter calculation on the excitation signal and the response signal based on a polynomial nonlinear function to obtain the initial nonlinear parameter, wherein the polynomial nonlinear function is expressed as follows:

$$p(x)=a_0+a_1x+a_2x_2+\cdots+a_{n-1}x_{n-1}+a_nx_n$$

where $p(x)$ represents the initial nonlinear parameter, x represents a static excitation parameter, a represents a coefficient of the polynomial nonlinear function, and n represents a highest degree of the polynomial nonlinear function.

5. The defect detection method based on nonlinear system identification as claimed in claim 1, wherein the performing linear parameter calculation on the excitation signal and the response signal to obtain the initial linear parameter comprises the following steps:
    S1, performing the linear parameter calculation on the excitation signal based on a polynomial input function to obtain an input linear parameter, wherein the polynomial input function is expressed as follows:

$$A(q^{-1})=1+a_1q^{-1}+a_2q^{-2}+\cdots+a_{n_a}q^{-n_a}$$

where $A(q^{-1})$ represents the input linear parameter, $q^{-1}$ represents a unit backward shift operator, $a_{n_a}$ represents a coefficient of the polynomial input function, and $n_a$ represents an order of the polynomial input function;

S2, performing the linear parameter calculation on the excitation signal based on a polynomial output function to obtain an output linear parameter, wherein the polynomial output function is expressed as follows:

$$B(q^{-1})=b_0+b_1q^{-1}+b_2q^{-2}+\cdots+b_{n_b}q^{-n_b}$$

where $B(q^{-1})$ represents the output linear parameter, $q^{-1}$ represents a unit backward shift operator, $b_{n_b}$ represents a coefficient of the polynomial output function, and $n_b$ represents an order of the polynomial output function; and S3, calculating the initial linear parameter based on the input linear parameter, the output linear parameter and a discrete transfer function, wherein the discrete transfer function is expressed as follows:

$$G(q^{-1}) = \frac{B(q^{-1})}{A(q^{-1})}$$

where $G(q^{-1})$ represents the initial linear parameter.

6. The defect detection method based on nonlinear system identification as claimed in claim 1, wherein the optimizing the initial Hammerstein model to obtain the Hammerstein model of the test specimen comprises:

performing optimizing calculation on the initial nonlinear parameter based on an adaptive particle swarm optimization (APSO) algorithm to obtain a nonlinear parameter;

performing fitting calculation on the initial linear parameter based on a least square method to obtain a linear parameter; and constructing the Hammerstein model of the test specimen according to the nonlinear parameter and the linear parameter.

7. The defect detection method based on nonlinear system identification as claimed in claim 1, wherein the adjusting the Hammerstein model of the test specimen by using the cross-validation method to obtain the adjusted Hammerstein model of the test specimen comprises:

dividing a pre-constructed data set into a plurality of training sets in a same proportion by using a K-fold cross-validation method; selecting one of the plurality of training sets as a validation set; training the Hammerstein model of the test specimen by using remaining training sets of the plurality of training sets to obtain a trained Hammerstein model of the test specimen; validating the trained Hammerstein model of the test specimen by using the validation set to obtain a performance evaluation index; and taking each of the plurality of training sets as a validation set to repeat the training and the validating to thereby obtain performance evaluation indexes of validation sets respectively corresponding to the plurality of training sets; and averaging the performance evaluation indexes of the validation sets to obtain an average value of the performance evaluation indexes; and adjusting the Hammerstein model of the test specimen according to the average value of the performance evaluation indexes to obtain the adjusted Hammerstein model of the test specimen.

8. A defect detection device based on nonlinear system identification, comprising: a signal generation unit, a signal acquisition unit, a model construction unit, and a defect detection unit;

wherein the signal generation unit is configured to: set a test schedule according to a size of a test specimen; perform, by a modal force hammer, hammer excitation on the test specimen according to the test schedule to generate an excitation signal; and make the test specimen vibrate based on the excitation signal to generate a response signal;

wherein the signal acquisition unit is configured to acquire, by a laser vibrometer, the excitation signal and the response signal;

wherein the model construction unit is configured to: perform nonlinear parameter calculation on the excitation signal and the response signal to obtain an initial nonlinear parameter; perform linear parameter calculation on the excitation signal and the response signal to obtain an initial linear parameter; construct an initial Hammerstein model based on the initial nonlinear parameter and the initial linear parameter; and optimize the initial Hammerstein model to obtain a Hammerstein model of the test specimen; and wherein the defect detection unit is configured to: adjust the Hammerstein model of the test specimen by using a cross-validation method to obtain an adjusted Hammerstein model of the test specimen; perform defect determination based on the adjusted Hammerstein model of the test specimen and a pre-constructed template specimen model to obtain a determination result; and determine whether the test specimen is defective based on the determination result; and wherein, in the defect detection unit, steps of performing the defect determination based on the adjusted Hammerstein model of the test specimen and the pre-constructed template specimen model to obtain the determination result, and determining whether the test specimen is defective based on the determination result comprise:

performing feature comparison on the adjusted Hammerstein model of the test specimen and the pre-constructed template specimen model to obtain comparison features, and determining whether the test specimen is defective based on the comparison features and preset defect conditions.

9. The defect detection device based on nonlinear system identification as claimed in claim 8, wherein, in the signal generation unit, a step of setting the test schedule according to the size of the test specimen comprises:

determining a number of detection contacts according to the size of the test specimen;

setting an arrangement mode of the detection contacts; and setting the test schedule according to the arrangement mode.

\* \* \* \* \*